United States Patent
Wijnands et al.

(10) Patent No.: US 9,806,897 B2
(45) Date of Patent: *Oct. 31, 2017

(54) BIT INDEXED EXPLICIT REPLICATION FORWARDING OPTIMIZATION

(71) Applicant: Cisco Technology, Inc., San Jose, CA (US)

(72) Inventors: Ijsbrand Wijnands, Leuven (BE); Gregory J. Shepherd, Eugene, OR (US); John H. W. Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,580

(22) Filed: Jan. 23, 2015

(65) Prior Publication Data

US 2015/0131659 A1   May 14, 2015

Related U.S. Application Data

(63) Continuation-in-part of application No. 14/488,790, filed on Sep. 17, 2014, which is a continuation-in-part
(Continued)

(51) Int. Cl.
*H04L 12/18* (2006.01)
*H04L 12/741* (2013.01)
*H04L 12/761* (2013.01)

(52) U.S. Cl.
CPC ......... *H04L 12/1886* (2013.01); *H04L 45/16* (2013.01); *H04L 45/54* (2013.01); *H04L 45/745* (2013.01)

(58) Field of Classification Search
None
See application file for complete search history.

(56) References Cited

U.S. PATENT DOCUMENTS

| 5,764,624 | A | 6/1998 | Endo | 370/218 |
| 5,999,531 | A | 12/1999 | Ferolito | 370/390 |

(Continued)

FOREIGN PATENT DOCUMENTS

| CN | 101572667 | 11/2009 | ............ H04L 12/56 |
| CN | 102025538 | 4/2011 | |
| WO | WO 2007/095331 | 8/2007 | ................... 370/390 |

OTHER PUBLICATIONS

Aggarwal, R., et al., "BGP Encodings and Procedures for Multicast in MPLS/BGP IP VPNs," Internet Engineering Task Force (IETF), Request for Comments 6514, Feb. 2012, pp. 1-59.
(Continued)

*Primary Examiner* — Chirag Shah
*Assistant Examiner* — Amar Persaud
(74) *Attorney, Agent, or Firm* — Campbell Stephenson LLP

(57) ABSTRACT

Various systems and methods for performing bit indexed explicit replication (BIER). For example, one method involves receiving a packet at a node. The packet includes a bit string. The node traverses the bit string and selects an entry in a bit indexed forwarding table (BIFT). The entry includes a forwarding bit mask. Based on the forwarding bit mask and the bit string, the node forwards the packet.

20 Claims, 13 Drawing Sheets

Related U.S. Application Data of application No. 14/488,761, filed on Sep. 17, 2014, said application No. 14/603,580 is a continuation-in-part of application No. 14/488,810, filed on Sep. 17, 2014.

(60) Provisional application No. 61/931,473, filed on Jan. 24, 2014, provisional application No. 61/878,693, filed on Sep. 17, 2013, provisional application No. 61/931,473, filed on Jan. 24, 2014.

(56) References Cited

U.S. PATENT DOCUMENTS

| | | | | |
|---|---|---|---|---|
| 6,148,000 | A | 11/2000 | Feldman | 370/394 |
| 6,240,188 | B1 | 5/2001 | Dondeti | 380/259 |
| 6,615,336 | B1 | 9/2003 | Chen | 711/202 |
| 6,771,673 | B1 | 8/2004 | Baum | 370/535 |
| 7,111,101 | B1* | 9/2006 | Bourke | H04L 49/101 326/40 |
| 7,519,733 | B1 | 4/2009 | Thubert et al. | 709/232 |
| 7,551,599 | B2 | 6/2009 | Levit et al. | 370/254 |
| 7,925,778 | B1 | 4/2011 | Wijnands | 370/389 |
| 8,320,374 | B2 | 11/2012 | de Heer | 370/390 |
| 8,325,726 | B2 | 12/2012 | Baban et al. | 370/390 |
| 8,774,179 | B1 | 7/2014 | Gaggara | 370/389 |
| 8,787,400 | B1 | 7/2014 | Barth | 370/419 |
| 8,848,728 | B1* | 9/2014 | Revah | H04L 47/125 370/386 |
| 8,942,256 | B1 | 1/2015 | Barth | 370/469 |
| 9,065,766 | B2 | 6/2015 | Matsuoka | |
| 2002/0126661 | A1* | 9/2002 | Ngai | H04L 12/42 370/380 |
| 2002/0191628 | A1 | 12/2002 | Liu | 370/428 |
| 2003/0043802 | A1 | 3/2003 | Yazaki | 370/389 |
| 2003/0142685 | A1 | 7/2003 | Bare | 370/410 |
| 2003/0210695 | A1* | 11/2003 | Henrion | H04L 45/00 370/392 |
| 2004/0264374 | A1 | 12/2004 | Yu | 370/230 |
| 2005/0169270 | A1 | 8/2005 | Mutou | 370/390 |
| 2006/0182035 | A1 | 8/2006 | Vasseur | 370/238 |
| 2006/0280192 | A1 | 12/2006 | Desanti | 370/409 |
| 2007/0127474 | A1 | 6/2007 | Mirtorabi et al. | 370/390 |
| 2007/0189291 | A1 | 8/2007 | Tian | 370/390 |
| 2008/0159285 | A1* | 7/2008 | de Heer | H04L 12/18 370/390 |
| 2008/0165783 | A1 | 7/2008 | Desanti | 370/392 |
| 2009/0067348 | A1 | 3/2009 | Vasseur | 370/256 |
| 2009/0219817 | A1 | 9/2009 | Carley | 370/235 |
| 2009/0310610 | A1 | 12/2009 | Sandstrom | 370/394 |
| 2010/0046515 | A1 | 2/2010 | Wong | 370/390 |
| 2011/0202761 | A1 | 8/2011 | Sarela et al. | 716/163 |
| 2011/0228770 | A1 | 9/2011 | Dholakia | 370/390 |
| 2011/0274112 | A1* | 11/2011 | Czaszar | H04L 63/0227 370/392 |
| 2012/0099591 | A1 | 4/2012 | Kotha | 370/392 |
| 2012/0243539 | A1* | 9/2012 | Keesara | H04L 45/66 370/392 |
| 2013/0034097 | A1 | 2/2013 | Dharmapurikar | 370/390 |
| 2013/0114595 | A1 | 5/2013 | Mack-Crane | 370/390 |
| 2013/0114619 | A1 | 5/2013 | Wakumoto | 370/406 |
| 2013/0136117 | A1* | 5/2013 | Schrum, Jr. | H04W 88/06 370/338 |
| 2013/0201988 | A1 | 8/2013 | Zhou | 370/390 |
| 2013/0308948 | A1 | 11/2013 | Swinkels | 398/66 |
| 2013/0336315 | A1 | 12/2013 | Guichard | 370/389 |
| 2013/0343384 | A1* | 12/2013 | Shepherd | H04L 12/18 370/390 |
| 2014/0010223 | A1 | 1/2014 | Wang | 370/390 |
| 2014/0043964 | A1 | 2/2014 | Gabriel | 370/229 |
| 2014/0098813 | A1 | 4/2014 | Mishra | 370/390 |
| 2014/0119191 | A1 | 5/2014 | Onoue | 370/236 |
| 2014/0160925 | A1 | 6/2014 | Xu | 370/235 |
| 2015/0003458 | A1 | 1/2015 | Li | 370/392 |
| 2015/0023328 | A1 | 1/2015 | Thubert et al. | 370/336 |
| 2015/0049760 | A1* | 2/2015 | Xu | H04L 45/16 370/390 |
| 2015/0078377 | A1 | 3/2015 | Wijnands et al. | 370/390 |
| 2015/0078378 | A1 | 3/2015 | Wijnands et al. | 370/390 |
| 2015/0078379 | A1 | 3/2015 | Wijnands et al. | 370/390 |
| 2015/0078380 | A1 | 3/2015 | Wijnands et al. | 370/390 |
| 2015/0085635 | A1 | 3/2015 | Wijnands et al. | 370/216 |
| 2015/0131658 | A1 | 5/2015 | Wijnands et al. | 370/390 |
| 2015/0131660 | A1 | 5/2015 | Wijnands et al. | 370/390 |
| 2015/0138961 | A1 | 5/2015 | Wijnands et al. | 370/228 |
| 2015/0139228 | A1 | 5/2015 | Wijnands et al. | 370/390 |
| 2015/0181309 | A1 | 6/2015 | Wijnands et al. | 725/109 |
| 2015/0334006 | A1 | 11/2015 | Shao | 370/225 |
| 2016/0142248 | A1 | 5/2016 | Thubert et al. | 370/372 |
| 2017/0099232 | A1 | 4/2017 | Shepherd | 370/390 |

OTHER PUBLICATIONS

Artel Video Systems, White Paper; "The Broadcaster's Guide to SMPTE 2022: Applications in Video Contribution and Distribution," Oct. 2014, pp. 1-7.

Bates, T. et al., "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Deering, S., Cisco Systems, Inc. and R. Hinden, Nokia, "Internet Protocol, Version 6 (IPv6)," Network Working Group, Request for Comments 2460, Dec. 1998, pp. 1-39.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc., "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25. 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.

(56) References Cited

OTHER PUBLICATIONS

Schulzrinne, H. et al.,; "RTP: A Transport Protocol for Real-Time Applications," Network Working Group, Request for Comments 3550, Jul. 2003, pp. 1-89.
SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014. © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks." Harris Corporation, Technology Conference, Apr. 2011, pp. 1-60.
Wijnands, Ijsbrand, et al.. Cisco Systems, Inc.; "Multipoint Label Distribution Protocol In-Band Signaling in a VPN Context, draft-wijnands-mpls-mldp-vpn-in-band-signaling-00," Internet-Draft, Oct. 7. 2011, pp. 1-13.
Wijnands, Ijsbrand, Cisco Systems, Inc.. "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Xu. X. et al., "BIER Encapsulation, draft-xu-bier-encapsulation-00," Network Working Group, Internet-Draft, Sep. 30, 2014, pp. 1-6.
Xu. X. et al., "BIER Encapsulation, draft-xu-bier-encapsulation-01," Network Working Group, Internet-Draft, Oct. 20. 2014, pp. 1-6.
Aguilar, L., "Datagram Routing for Internet Multicasting," SRI International, Menlo Park, California, ACM SIGCOMM Computer Communication Review Newsletter, vol. 14. Issue 2, Jun. 1984, pp. 58-63.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].
Eckert, Toerless et al., "Traffic Engineering for Bit Indexed Explicit Replication", U.S. Appl. No. 14/814,574, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).
Das, Kaushik, "IPv6 Header Deconstructed"; http://www.ipv6.com/articles/general/IPv6-Header.htm; Apr. 18, 2008; 2 pages.
Wijnands, Ijsbrand, et al., "Multicast Using Bit Index Explicit Replication, draft-Wijnands-bier-architecture-03," Internet Engineering Task Force, Internet-Draft, Jan. 27, 2015; pp. 1-29.
Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).
Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).
Wang, Xiaorong.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).
Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).
Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).
Microsoft,"IPv6 Addressing (TechRef)"; Apr. 3, 2011; http://technet.microsoft.com/enus/library/dd392266(v=ws. 10).aspx; pp. 1-30.

* cited by examiner

| Bit Indexed Routing Table X | | |
|---|---|---|
| BFR-ID (SI:BP) | BFR Prefix | NBR |
| 5 (0:10000) | P | D |
| 4 (0:01000) | N | C |
| 3 (0:00100) | M | B |
| 2 (0:00010) | L | A |
| 1 (0:00001) | O | D |

*FIG. 5A*

| BIFT X | |
|---|---|
| FBM | NBR |
| 00010 | A |
| 00100 | B |
| 01000 | C |
| 10001 | D |

*FIG. 5B*

| Optimized BIFT X | | |
|---|---|---|
| BP | FBM | NBR |
| 1 | 10001 | D |
| 2 | 00010 | A |
| 3 | 00100 | B |
| 4 | 01000 | C |
| 5 | 10001 | D |

BIT INDEXED EXPLICIT REPLICATION FORWARDING OPTIMIZATION

RELATED APPLICATIONS

This application claims the domestic benefit under Title 35 of the United States Code §119(e) of U.S. Provisional Patent Application Ser. No. 61/931,473, entitled "Bit Mask Forwarding Architectures for Stateless Multipoint Replication," filed Jan. 24, 2014, which is hereby incorporated by reference in its entirety and for all purposes as if completely and fully set forth herein.

This application is also a continuation-in-part of U.S. application Ser. No. 14/488,790, entitled "Bit Indexed Explicit Replication Using Multiprotocol Label Switching," filed Sep. 17, 2014, which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,761, entitled "Bit Indexed Explicit Replication," which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,810, entitled "Bit Indexed Explicit Replication Using Internet Protocol Version 6," filed Sep. 17, 2014, which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Each of the two provisional and three non-provisional applications referenced above is hereby incorporated by reference in its entirety and for all purposes as if completely and fully set forth herein.

BACKGROUND OF THE INVENTION

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. In many networks, multicast is the preferred method of data forwarding. One reason for this is that multicast is a bandwidth-conserving technology that reduces traffic by simultaneously delivering data to multiple receivers. However, in traditional multicast systems, a relatively large amount of control plane information is used. Setting up and maintaining this control information has a tendency to become complex and costly in terms of computing resources, and can become a major limiting factor in overall network performance. Another issue with multicast is that due to packet delivery mechanisms used, packets are sometimes forwarded to locations where the packets were not desired. This unnecessary delivery of packets represents an unwelcome burden on network performance. Overcoming this burden by traditional means involves generation and maintenance of even more control plane information.

BRIEF DESCRIPTION OF THE DRAWINGS

The present disclosure may be better understood, and its numerous objects, features, and advantages made apparent to those skilled in the art by referencing the accompanying drawings.

FIG. 5A is an example table generated by node, according to the present description.

FIG. 5B is an example table generated by node, according to the present description.

FIG. 5C is an example table generated by node, according to the present description.

DETAILED DESCRIPTION

Overview

Various systems and methods for performing bit indexed explicit replication (BIER). For example, one method involves receiving a packet at a node. The packet includes a bit string. The node traverses the bit string and selects an entry in a bit indexed forwarding table (BIFT). The entry includes a forwarding bit mask. Based on the forwarding bit mask and the bit string, the node forwards the packet.

Multicast

Multicast delivers multicast data packets (data packets that traditionally include information identifying a multicast group, such as a multicast group address) from a source to multiple receivers without unduly burdening the source. As used herein, the term "receiver" signifies a host (such as a computing device or application) that subscribes to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Figure 1:
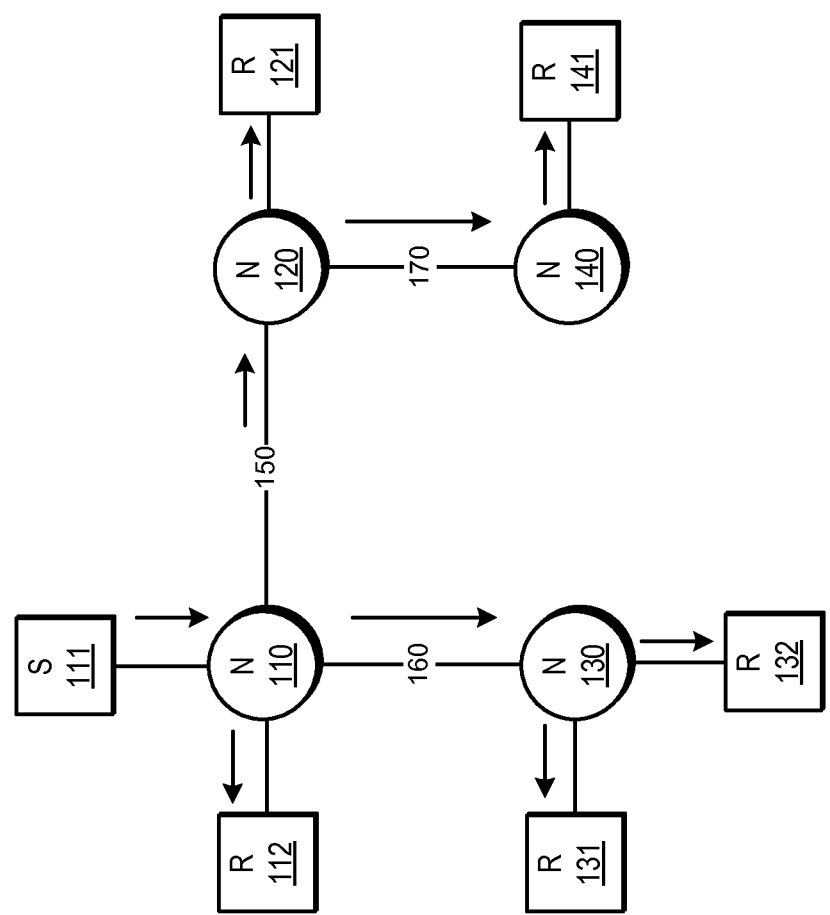
FIG. 1 is a simplified block diagram illustrating certain components of an example network.

FIG. 1 is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected to a multicast distribution tree (MDT) to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using join messages, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110 as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

As can be seen, the process traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability.

Bit Indexed Explicit Replication

As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified nodes. BIER enables packets to be forwarded from a source to multiple receivers without the use of multicast distribution trees and per-group state information at each node between the source and receivers.

Figure 2:
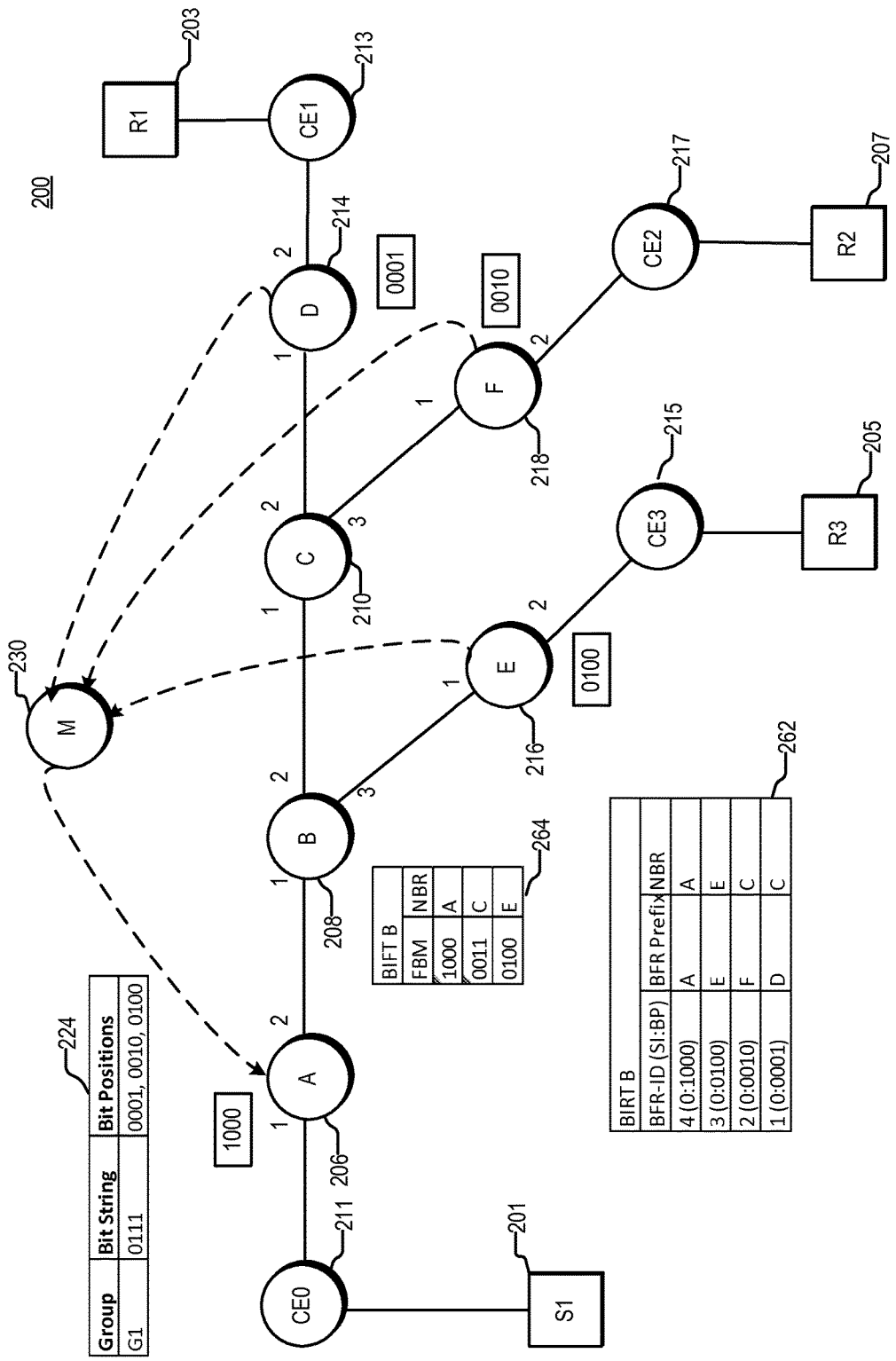
FIG. 2 is a simplified block diagram illustrating certain components of an example network.

FIG. 2 shows an example network 200. Network 200 includes BIER-enabled nodes 206-218. BIER-enabled nodes are configured to forward packets using BIER, and are referred to as bit forwarding routers (BFRs). BFRs 206-218 form a provider network, or domain. Such a provider network could be employed by an Internet service provider to transport packets to customers. The domain includes transit nodes 208 and 210, and provider edge nodes 206, 214, 216, and 218. The provider edge nodes are coupled to customer edge nodes 211, 213, 215, and 217. Hosts 201, 203, 205, and 207 are computing devices coupled to the customer edge nodes.

Each of the BFRs 206-218 has interfaces that are identified as shown. For example, BFR 208 has three interfaces designated 1-3, respectively. Each BFR is assigned a unique identifier or routable address known as a router identifier (RID). The RID can be implemented as, for example, an internet protocol (IP) address, a prefix, or a loopback address. Each BFR advertises or floods the routable address to all other BFRs in network 200. Each BFR builds a unicast topology of the BFRs in network 200 using the advertised routable addresses. In one embodiment, the router identifier can be mathematically converted to the set identifier and bit position assigned to a BFR. The conversion depends on the length of bit string being used. For example, to convert a router identifier 'N' to a set identifier and bit position, the set identifier is the integer part of the quotient (N−1)/BitStringLength. The bit position is ((N−1) modulo BitStringLength)+1. If, in the above example, N equals 257 and the BitStringLength is 256, the SI is 1 and the BP is 1. BIER network 200 also includes a node configured to operate as a multicast data controller (MDC) 230. The MDC performs configuration and administrative tasks, as described below.

BFR 206 is configured as a bit forwarding ingress router (BFIR) for multicast data packets. BFR 206 is coupled, via customer edge node 211, to source 201. Multicast data packets from source 201 enter the BIER network via the BFIR (BFR 206). Each of BFRs 214, 216, and 218 is configured as a bit forwarding egress router (BFER). The BFERs can be connected (directly or via customer edge routers) to hosts, such as receivers, or other networks. A BFER is a BFR that is the last BFR on a path between a source and a receiver. The BFER may be a provider edge (PE) node that is coupled to the receiver either directly or indirectly (e.g., through a non-BIER-enabled CE node).

Assigning a Bit Position in the Bit String

Each BFER in a BIER network is assigned a bit position (BP) from a set or array of bits. The array of bits can be carried in a packet or other network message. The array of bits can also be stored in forwarding and/or routing tables. For the sake of clarity, the terms used herein are "bit string" (when the array of bits is in a packet) and "bit mask" (when the array of bits is stored in a table). Also, it is noted that BFIRs can act as BFERs and vice versa. BFIRs are also assigned bit positions.

The bit string (or bit mask) can have a fixed or variable length. The length of the bit string used in the BIER network can be statically configured or dynamically assigned, and is distributed through the BIER network. In one embodiment, the length of the bit string is between 256 and 1024 bits, though shorter or longer bit strings can be used. The maximum length of the bit string value is determined, in one embodiment, by hardware or software limitations of the BFRs in the BIER network. In one embodiment, different BFRs in the BIER network use different lengths for their respective bit strings. For example, one BFR may have a maximum bit string length of 128 bits while another BFR may have a maximum bit string length of 256 bits. A bit string is one type of multicast forwarding entry in which each bit position of multiple bit positions is an element that can be used to represent an individual node or interface. Other types of multicast forwarding entries with other types of elements can be used.

A bit position (BP) is statically or dynamically assigned to each BFER. Each BFER should have at least one unique bit position from the bit string. In one embodiment, a central authority, such as a multicast domain controller, will assign the BPs to the BFERs. The multicast domain controller, in one embodiment, assigns multiple BPs to a single BFER, e.g., a unique BP for each of one or more interfaces included in the BFER. Other mechanisms for assigning BPs can be implemented as well, such as deriving a BP from a router identifier assigned to a BFR, where the derivation utilizes a mapping algorithm. In some embodiments, a bit position in the bit string is assigned to a single BFER. In other embodiments, a single BP can be assigned to more than one BFER. When multiple BFERs are assigned the same BP, one of the multiple BFERs can assume ownership of the BP at a given time, and ownership can be transferred between the multiple BFERs. Ownership of the BP can be transferred to another one of the multiple BFERs for any of several reasons, such as a failover in response to a node or link failure, or if one of the multiple BFERs otherwise becomes unavailable, in response to changing network conditions, due to time-sharing considerations, and the like. Assigning one BP to multiple BFERs facilitates operation similar to anycast, in which packets are forwarded to one receiver of a group of receivers, where each receiver in the group of receivers uses a common address.

Only the BIER-enabled edge nodes (e.g., BFERs and BFIRs) in a BIER network are assigned a BP. All other BFRs in the network (e.g., transit nodes) don't need a BP to participate in BIER. This helps to reduce the number of bits assigned in a network. As shown in the example of FIG. 2, network 200 utilizes a four bit long bit string. Each of the four BFERs (including BFIR node 206) in network 200 is assigned a BP: node 206 is assigned BP {1000}; node 214 is assigned BP {0001}; node 216 is assigned BP {0100}; and node 218 is assigned BP {0010}.

Sets

The number of BFERs that can be addressed (assigned a BP) is limited by the size of the bit string included in the multicast data packet. If the bit string is four bits long, the number of BFERs that can be addressed is four. The concept of sets allows an increase in the number of BFERs that can be assigned BPs. The set identifier (SI) is, for example, a number between 0 and 255. The SI allows a BP to be unique in the context of a set. For example, each BP can be re-used in each set. In an embodiment with 256 sets and a bit string length of 256 bits, 65536 (256×256) BFERs can be supported. In one embodiment, BFRs in the BIER network generate separate forwarding information for each SI. For example, if two different set identifiers are in use in the BIER network, the BFRs generate two bit indexed forwarding tables (BIFTs), one corresponding to each SI. In response to receiving a multicast data packet having a SI, the BFR uses the SI to select which forwarding information (e.g., BIFT) to use to forward the multicast data packet.

Signaling

When a receiver (e.g., a host, such as host 203 of FIG. 2) wishes to join a multicast group, the receiver sends membership information (e.g., using Internet Group Management Protocol (IGMP)) to the BFER the receiver is coupled to (either directly or indirectly). The membership information identifies the multicast group the host wishes to join and optionally identifies a source associated with the multicast group. In the example of FIG. 2, host 203 can send an IGMP message to CE node 213 and CE node 213 can then forward the IGMP message to BFR 214. In response to receiving a message indicating a receiver wishes to join a multicast group, the BFER signals its interest in the multicast group identified in the message. This involves, in one embodiment, the BFER sending a membership message to any BFIRs in the network, or to a controller, indicating the BFER's interest in the multicast group and including the BFER's BP. In one embodiment, BFERs use border gateway protocol (BGP) to send membership messages.

The BFER can send the membership message to a subset (less than all) or to all of the BFRs on the edge of the BIER network (BFIRs and BFERs) or can flood the signaling message to all nodes in the network. For example, if the network is using source-specific multicast (SSM), the BFER knows the source of the multicast group (e.g., from the IGMP message received from the receiver) and can look up a path to the specified BFIR and send the signaling message to that BFIR only. If SSM is not the type of multicast being used, the BFER can flood the signaling message to all candidate BFIRs. Only BIER-enabled edge nodes parse the message to determine group and BP information, all other nodes can discard the message. Receivers joining and unsubscribing from multicast groups do not create churn or require any changes in the state information (e.g., bit indexed forwarding tables) maintained by the core BFRs, unlike with traditional multicast. Instead, join or unsubscribe messages signal BFIRs to update the bit string associated with a given multicast group. This involves only the BFIRs updating state information (e.g., updating a group membership table associated with the group) and not the core nodes. This represents a significant improvement over traditional multicast, in which multicast distribution trees are set up and torn down throughout the network based on the join and unsubscribe messages.

Each BFIR, such as BFR 206 of FIG. 2, maintains state information that includes an entry for each multicast group for which the BFIR has received a membership message. In one embodiment, the BFIR maintains the state in a group membership table (GMT), as shown at 224 of FIG. 2. In one embodiment, each entry in the GMT includes information identifying the multicast group (such as a multicast group name and/or an address of a source for the multicast group), a list of BPs corresponding to BFERs that have expressed interest (e.g., via a membership message) in the multicast group identified in the group field, and a bit string, which identifies all of the BFERs that have expressed interest in the multicast group (e.g., by having a bit set in the bit position corresponding to each BFER that has expressed interest in the multicast group). In response to receiving a membership message from a BFER indicating that the BFER is interested in a multicast group, the BFIR sets the bit corresponding to the BFER's BP in the bit string that corresponds to the multicast group. The membership message includes, in one embodiment, the BFER's BP. Alternatively, the BFIR performs a lookup to determine the BP associated with the BFER that originated the membership message using the address of the BFER that originated the membership message and the information advertised via IGP, e.g., information in the BFIR's BIRT. When the BFER is no longer interested in receiving multicast data packets for the multicast group, the BFER signals to the BFIR, e.g., using an unsubscribe message, and the BFIR clears the corresponding bit in the bit string.

The BIER network forwards multicast data packets through the BIER network based on the bit string. The BFIR transmits the bit string along with multicast data packets into the BIER network. There are number of different techniques available for transmitting the bit string. This description refers to encapsulating the bit string into the multicast data packet. This terminology covers not only incorporating the BM into the multicast data packet (e.g., as header or payload information), but also appending or prepending some or all of the bit string to the multicast data packet.

Figure 3A:
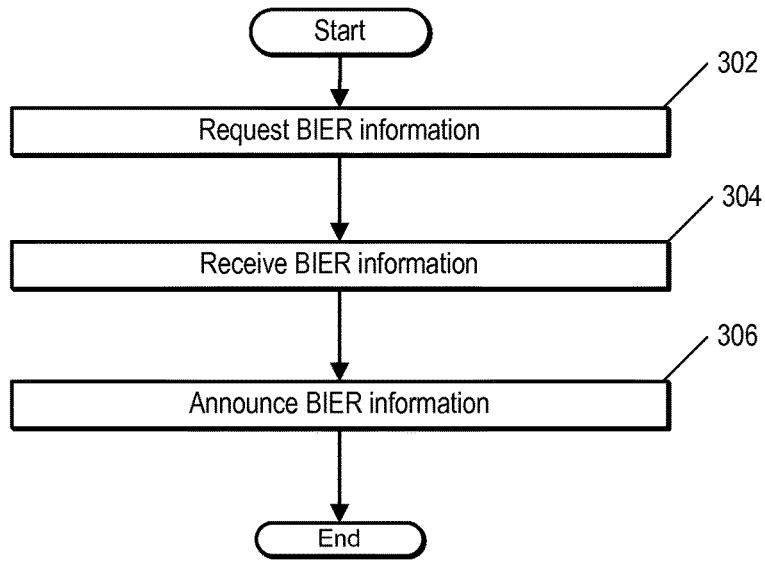
FIG. 3A is a flow chart illustrating an example process employed by a node, according to the present description.

FIG. 3A is a flowchart that illustrates the operations discussed above. In one embodiment, the method is performed by a BFER, such BFR 214 of FIG. 2. At 302, the BFER requests BIER information, such as a bit position and set identifier. Requesting BIER information involves, in on embodiment, the BFER sending a message to a multicast domain controller, such as multicast domain controller 230 of FIG. 2. In one embodiment, the BIER information is automatically provided to the BFER in response to detecting the BFER has joined the network, or in response to some other condition. An administrator can manually configure the BFER with a BP and set identifier.

At 304, the BFER receives the BIER information, either as a result of administrative configuration, or, for example, included in a message from the MDC in response to the request for BIER information. At 306, in response to the BFER receiving the BIER information, the BFER advertises its BIER information and its router identifier, to some or all of the other nodes in the BIER network. In one embodiment, the BFER advertises its BP and SI via an interior gateway protocol (IGP). For example, Intermediate System to Intermediate System (ISIS) and/or Open Shortest Path First (OSPF) can be modified to assist in distributing this information through the BIER network using link state updates. Other flooding mechanisms to distribute the information are possible. All BFRs in a BIER network, not just the BFERs, also flood their router identifier, which is used in building network topology and unicast forwarding tables. BFRs, in one embodiment, advertise additional information as well, such as a bit string size that the BFR is configured to use. Adding such BIER information to the advertised information is a relatively small amount of additional information, as compared with the state information maintained on a per-group basis in traditional multicast.

Figure 3B:
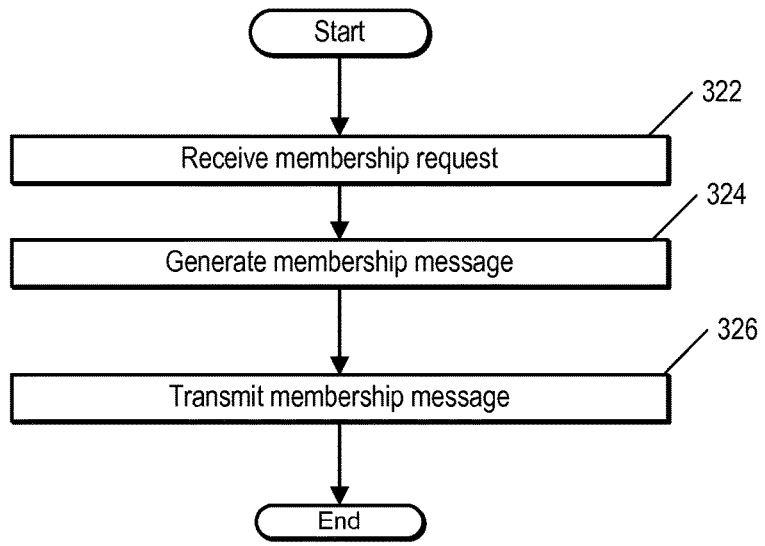
FIG. 3B is a flow chart illustrating an example process employed by a node, according to the present description.

FIG. 3B shows an example method of utilizing overlay signaling to distribute membership information in a BIER network. In one embodiment, the method of FIG. 3B is performed by a BFER, such as BFR 214 of FIG. 2.

At 322, the BFER receives a membership request from a host, such as host 203 of FIG. 2. The membership request is optionally relayed through a customer edge node, such as customer edge node 213 of FIG. 2. In one embodiment, the membership request comprises an IGMP message. The membership request includes information identifying a multicast group, and information identifying whether the host wishes to join, e.g. subscribe, or leave, e.g. unsubscribe from, the multicast group. In response to receiving the membership request, the BFER updates forwarding information indicating the host's membership in the multicast group. For example, if the membership request indicates that the host wishes to join multicast group G1, the BFER updates a forwarding entry such that any multicast data packets received by the BFER and addressed to multicast group G1 will be forwarded to the host by the BFER.

At 324, the BFER generates a membership message. The membership message signals the BFER's interest in the multicast group. The membership message carries information identifying the multicast group, and information identifying the BFER, such as the set identifier and bit position of the BFER. In one embodiment, the membership message is implemented using BGP.

At 326, the BFER transmits the membership message. In one embodiment, transmitting the membership message involves forwarding the membership message to a multicast domain controller, such as MDC 230 of FIG. 2. The MDC then transmits the membership message to some or all of the edge routers in the BIER domain, e.g., BFERs and BFIRs.

Bit Indexed Routing and Forwarding Tables

Each BFR in the BIER network uses the advertised BPs and router identifiers of the other BFRs to generate one or more bit indexed routing tables (BIRTs) and bit indexed forwarding tables (BIFTs). The BFRs use these tables to forward multicast data packets. A bit indexed routing table, as shown by example BIRT 262 of FIG. 2, is a table that stores BP-to-router identifier mappings, e.g., as learned via an interior gateway protocol (IGP). Each BFR receives BP-to-router identifier mappings and stores them in a BIRT. Using the router identifiers, a BFR performs a recursive lookup in unicast routing tables to identify a directly connected next hop BFR (referred to herein as a neighbor (NBR)) on the shortest path from the BFR toward the BFR associated with the BP. In one embodiment, the NBR is the next hop on a shortest path (SPT) towards the BFER that advertised the BP. In one embodiment, the BIRT includes one entry per BP.

Each BFR translates its BIRT(s) into one or more bit indexed forwarding tables (BIFTs). FIG. 2 illustrates an example BIFT 264 as generated by BFR B 208. Generating a BIFT involves, in one embodiment, first sorting the BIRT by neighbor. For entries in the BIRT that have a common NBR, the bit masks of those entries are OR'd together, creating a bit mask that is a combination of the BPs from those entries. This is referred to herein as a forwarding bit mask (FBM) or just bit mask (BM). Each bit that is set in the FBM indicates a BFER that is reachable via the neighbor associated with the FBM in the BIFT. Multicast data packets are forwarded by the BFRs using the BIFTs. For example, according to BIFT 264, if a multicast data packet having a bit string with BP {0001} set arrives at node 208, the multicast data packet should be forwarded to NBR C (BFR 210 in the example of FIG. 2). If a multicast data packet arrives at node 208 having a BP of {1000} set, the multicast data packet should be forwarded to NBR A (BFR 206 in the example of FIG. 2). If a multicast data packet arrives at node 208 having a bit string of {1001}, the multicast data packet should be forwarded to both NBR A and NBR C.

Packet Forwarding

After encapsulating the bit string into a multicast data packet, the BFIR forwards the multicast data packet to one or more BFRs using the BFIR's BFTS(s). A BFR that receives the multicast data packet determines, using the bit string in the multicast data packet and the BFR's own BFT(s), whether to forward the multicast data packet to one or more of its neighbors, and if so, to which one(s). To do so, the BFR compares the bit string in the multicast data packet with the FBM entries in the BFR's BFT. In one embodiment, the BFR performs a logical AND operation between the multicast data packet's bit string and the FBMs in the BFR's BFT. As noted, the BFR's BFT includes, in one embodiment, an entry for each neighbor of the BFR, and each entry includes a FBM field that indicates which BFERs are reachable along a shortest path via the neighbor identified in the entry. If the result of the AND is TRUE for a given neighbor, the BFR forwards the multicast data packet to that neighbor. A TRUE result indicates that an FBM for a given neighbor in the BFR's BIFT has one or more bits set to 1 and that a corresponding bit (or bits) in the multicast data packet's bit string is also set to 1. The set bits in the multicast data packet's bit string indicate which BFERs have expressed interest in the multicast group, and the set bit in the BFR's BIFT entry indicates that the BFER that has expressed interest is reachable via the neighbor indicated in the entry. A BFR forwards a multicast data packet that contains a bit string to all neighbors for which the bit-wise AND operation between the bit string in the multicast data packet and the FBMs in the BFR's BIFT is TRUE.

In the example of FIG. 2, BFR 214 (a BFER) signals to BFR 206 (a BFIR) that BFR 214 is interested in receiving packets associated with a given multicast group or flow. BFRs 216 and 218 likewise signal BFR 206 that BFRs 216 and 218 are interested in the same multicast group. The signaling is represented by the dashed lines shown in FIG. 2. BFR 206 updates an entry in group membership table 224 (or creates one if one does not already exist) for the multicast group and updates a bit string in the entry by setting bits corresponding to BFRs 214, 216, and 218. The bit string corresponding to the multicast group is {0111}.

BFR 206 is configured to receive a multicast data packet addressed to the multicast group or flow (e.g., from source 201 via CE node 211). BFR 206 uses the multicast group address and/or source address included in the multicast data packet to access its GMT and select a bit string associated with the multicast group. After selecting a bit string that corresponds to the multicast group from the GMT, BFR 206 encapsulates the bit string for that multicast group into the multicast data packet and identifies the neighbors to which the packet will be forwarded (e.g., using its BFT). In one embodiment, this involves performing an AND operation between the bit string and each entry in BFR 206's BIFT. In this example, there is only one entry in the BIFT and the entry corresponds to BFR 208. This means that the shortest path from BFR 206 to all three of the BFERs in network 200 runs through BFR 208. Since the result of the AND is TRUE for NBR B (BFR 208), BFR 206 forwards the multicast data packet to BFR 208. BFR 206 also modifies the bit string in the multicast data packet it forwards, as discussed below.

In response to receiving the multicast data packet, BFR 208 performs an AND between the bit string in the multicast data packet, {0111}, and each entry in its BIFT (shown at 264). The result for NBR C is TRUE so BFR 208 forwards the multicast data packet to BFR 210. BFR 208 also modifies the bit string in the multicast data packet it forwards by clearing bits corresponding to BFERs that are not reachable via a shortest path through the BFR to which the multicast data packet is being forwarded. In this example, since node E is not reachable via node C (the shortest path from node B to node E does not run through C), node B clears the bit corresponding to node E in the bit string that node B forwards to node C, Thus, node B forwards the multicast data packet to node C with the bit string {0011}. The result for NBR E is also TRUE, so BFR 208 replicates the multicast data packet and forwards the multicast data packet to BFR 216, which is a BFER. Node B updates the bit string and forwards the multicast data packet to node E with the bit string {0100}.

BFR 210, in response to receiving the multicast data packet, performs an AND between the bit string in the multicast data packet, {0011}, and each entry in its BIFT and forwards the multicast data packet to BFR 214 which is a BFER and BFR 218.

Packet Forwarding Optimization

The process of packet forwarding described above involves a BFR comparing the bit string in an incoming multicast data packet with each entry in the BFR's BIFT. Each entry in the BFR's BIFT corresponds to a neighbor, so if the number of neighbors is large, the number of comparisons the BFR performs also is large. Each comparison represents a burden on computing resources and takes time. Therefore, it is desirable to reduce the number of comparisons involved in forwarding a multicast data packet. An embodiment, described below with regard to FIGS. 4-9, involves optimizing the forwarding information maintained by BFRs in a BIER network. A BFR generates a BIFT that is indexed by bit position, rather than by neighbor. The BFR compares the bit string with BIFT entries that correspond to set bits in the bit string. In this embodiment, the maximum number of comparisons the BFR performs is limited by the length of the bit string.

Figure 4:
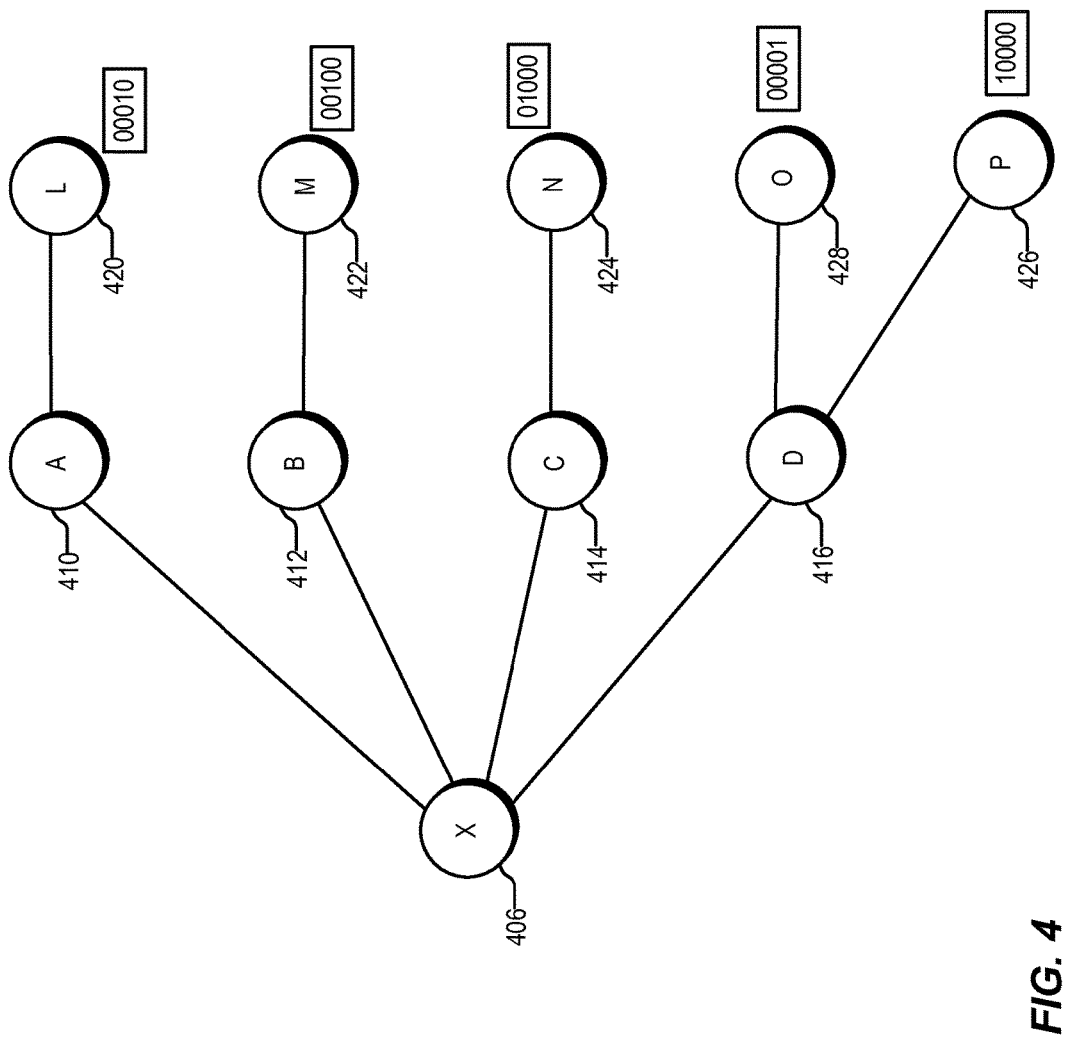
FIG. 4 is a simplified block diagram illustrating certain components of an example network.

FIG. 4 is a simplified block diagram illustrating certain components of an example network 400. BFRs 410 through 416 are BFRs configured as transit nodes. BFRs 420 through 428 are BFRs configured as BFERs, with bit positions assigned as shown. BFR 406 is a BFR that can be either a transit node or a BFIR. In one embodiment, the BFRs are coupled directly or indirectly to one or more hosts (not shown), e.g., via one or more customer edge nodes (not shown). Network 400 also includes, optionally, a multicast data controller (not shown).

FIG. 5A shows an example bit indexed routing table (BIRT) 502 generated by a BFR, such as node 406 of FIG. 4. BIRT 502 includes three columns. The first column includes information identifying a bit position and (optionally) set identifier for each BFER included in the BIER network (e.g., network 400 of FIG. 4). In one embodiment, the column also includes a BFR-ID, or virtual bit position. A virtual bit position can be implemented as an integer unique among the edge routers in a BIER network. The second column includes a routable address for each of the BFERs, such as a loopback or BFR prefix. The third column includes one or more entries for the neighbor or neighbors via which the BFER corresponding to the BFR prefix is reachable along a shortest path from the node.

FIG. 5B is an example bit indexed forwarding table (BIFT) 504 generated, for example, by a BFR, such as node 406 of FIG. 4. BIFT 504 is generated using the information in BIRT 502 of FIG. 5A. As shown, BIFT 504 includes a column for a forwarding bit mask (FBM). BIFT 504 also includes a column for neighbors. BIFT 504 indicates that each of the bit positions set in the FBM is reachable via the corresponding neighbor. For example, considering the first entry in BIFT 504, BFERs corresponding to bit positions 1, 2, and 3 are reachable via neighbor A. BIFT 504 is indexed by NBR. That is, there is an entry corresponding to each of the BFRs neighbors.

FIG. 5C is an example optimized bit indexed forwarding table (BIFT) 506 generated, for example, by a BFR, such as node 406 of FIG. 4. Optimized BIFT 506 is indexed by bit position. Optimized BIFT 506 includes an entry for each bit position in a BIER network. The entry includes information identifying the BP, a neighbor via which a BFER corresponding to the BP is reachable, and a forwarding bit mask that identifies all BFERs reachable via the neighbor. A BFR generates an optimized BIFT using the BFR's BIRT and/or the BFRs BIFT (e.g., the BFR can convert a non-optimized BIFT into an optimized BIFT).

Figure 6:
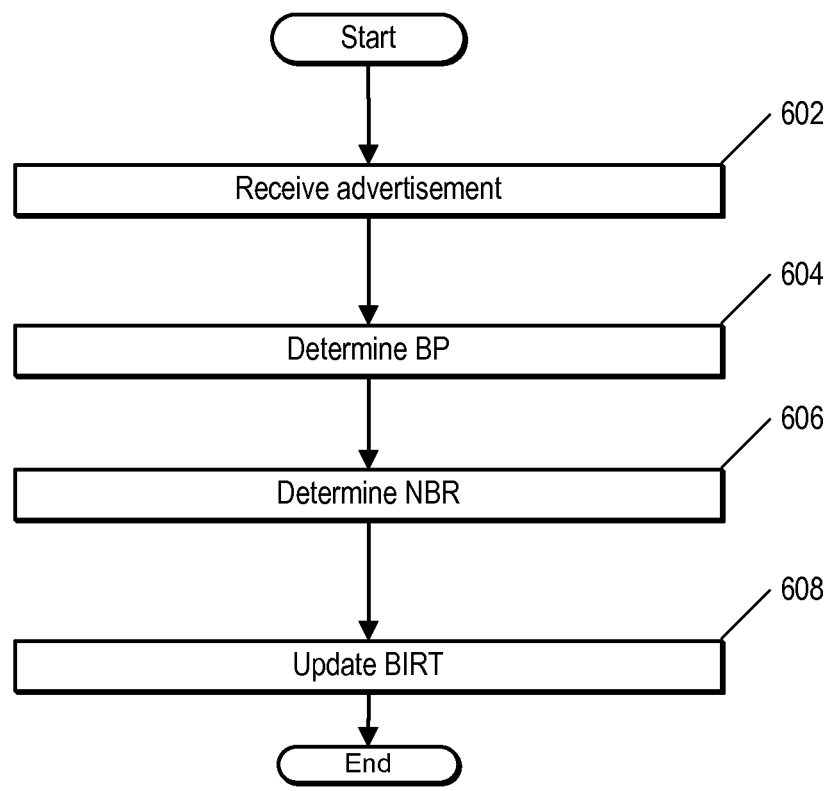
FIG. 6 is a flow chart illustrating an example process employed by a node, according to the present description.

FIG. 6 is a flow chart illustrating an example process for generating a bit indexed routing table (BIRT). In one embodiment, FIG. 6 is performed by a BFR, such as BFR 406 of FIG. 4.

At 602, the BFR receives an advertisement generated by a BFER. In one embodiment, the advertisement is received via IGP and includes information identifying a mapping between a routable address associated with the BFER, such as a router identifier, and a bit position and set identifier associated with the BFER. In response to receiving the advertisement, the BFR determines, at 604, the BFR ID and BP included in the advertisement. The BFR also determines the set identifier, if one is included in the advertisement.

At 606, the BFR accesses its stored topology information to determine the next hop neighbor along the shortest path towards the BFER that generated the advertisement. At 608, the BFR updates the BIRT. In one embodiment, this comprises adding an entry that includes information identifying the BFR ID and bit position of the BFER, as well as the neighbor via which the BFER is reachable.

Figure 7:
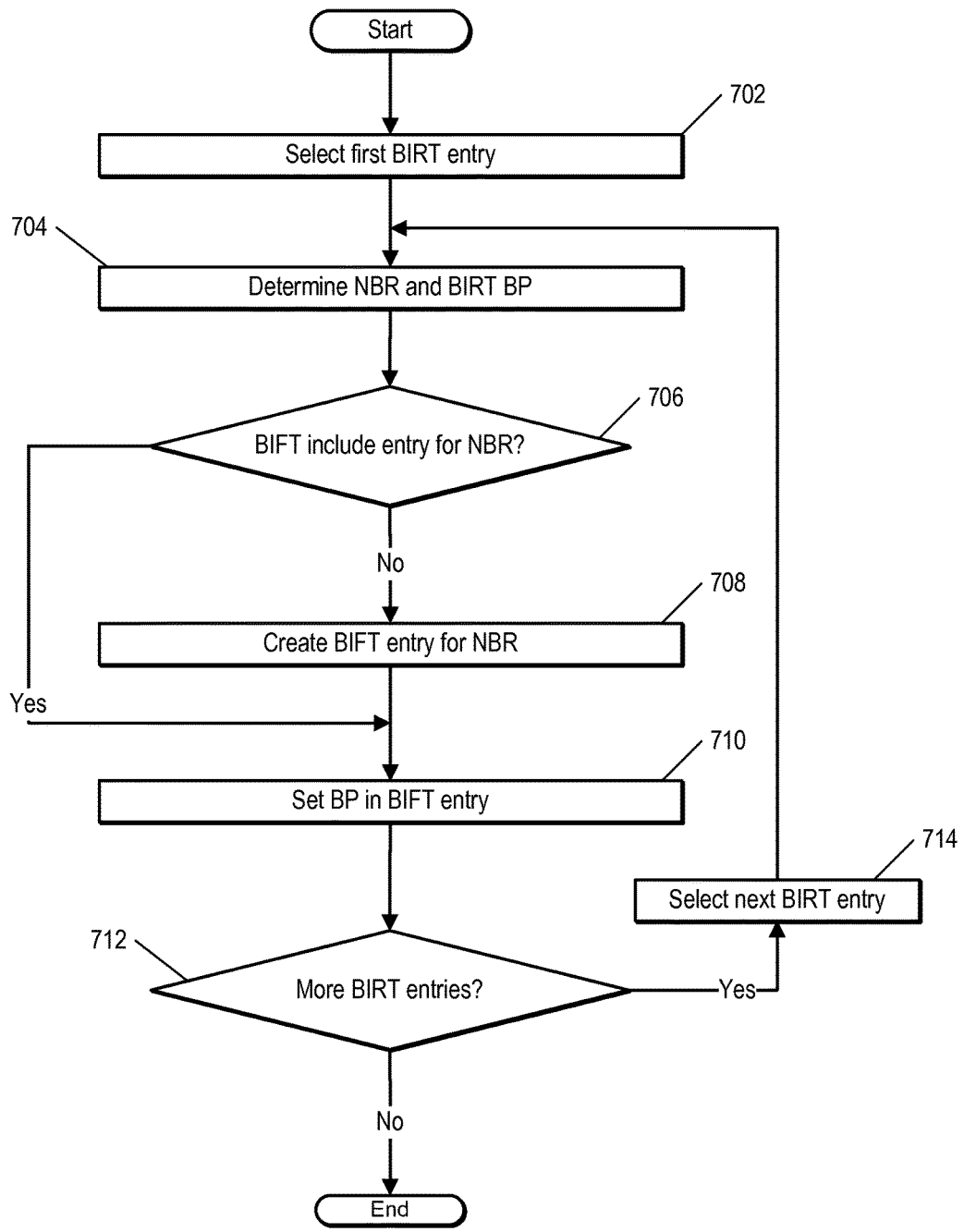
FIG. 7 is a flow chart illustrating an example process employed by a node, according to the present description.

FIG. 7 is a flow chart illustrating an example process of generating a BIFT employed by a node, according to the present description. In one embodiment, FIG. 7 is performed by a BFR, such as BFR 406 of FIG. 4. Performance of the process of FIG. 7 produces a BIFT that is indexed by neighbor.

At 702, the BFR selects a first entry in the BFR's BIRT. At 704, the BFR determines the neighbor and bit position associated with the entry. In one embodiment, the neighbor is identified by a BFR ID or prefix or other information. At 706, the BFR determines whether the BIFT already includes an entry for the neighbor. In the case of the first BIRT entry, there is not a BIFT entry corresponding to the neighbor identifying the BIRT entry. If there is no BIFT entry corresponding to the neighbor, the BFR creates a BIFT entry corresponding to the neighbor at 708. At 710, the BFR sets a bit in the FBM corresponding to the bit position identified in the BIRT entry. At 712, the BFR determines whether the BIRT includes additional entries. If so, the BFR selects the next BIRT entry at 714.

For example, considering BIRT 502 of FIG. 5A, at 702, the BFR selects the first entry in the BIRT. In the example of BIRT 502, the first entry corresponds to neighbor D. Next, the BFR determines, at 704, that the entry corresponds to BP 5. That is, node P, which has been assigned BP 5, is reachable from the BFR via node D. Next, the BFR creates an entry in its BIFT for neighbor D and sets the fifth bit in the FBM. FIG. 5B shows that the entry corresponding to neighbor D has bit 5 set. The BFR then proceeds iteratively, next selecting the entry for neighbor C corresponding to bit 4, and so on. After performing the method shown in FIG. 7, the BFR will have a BIFT that includes one entry for each of the BFR's neighbors and each entry will include a forwarding bit mask that has a bit set for each of the BFERs reachable that neighbor.

Figure 8A:
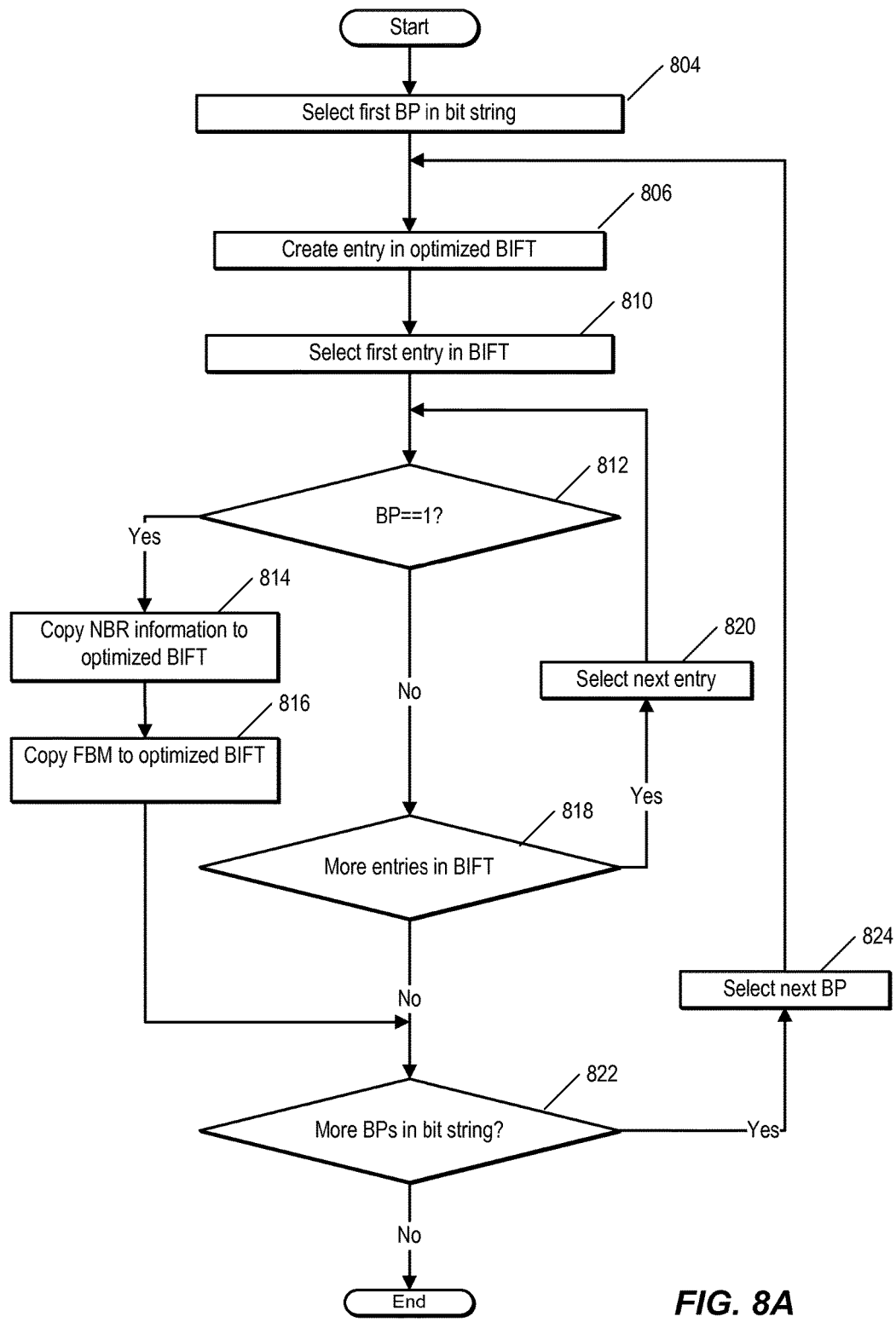
FIG. 8A is a flow chart illustrating an example process employed by a node, according to the present description.

FIG. 8A is a flow chart illustrating an example process of generating a BIFT employed by a node, according to the present description. In one embodiment, FIG. 8A is performed by a BFR, such as BFR 406 of FIG. 4. FIG. 8A depicts a method of converting an existing non-optimized BIFT, as shown in FIG. 5B into an optimized BIFT, as shown in FIG. 5C.

At 804, the BFR selects the first BP in a bit string. In one embodiment, the bit string corresponds to a forwarding bit mask in the non-optimized BIFT. At 806, the BFR creates an entry corresponding to the selected BP in the optimized BIFT. In one embodiment, the entry includes a field for information identifying a neighbor via which a BFER corresponding to the BP is reachable and an FBM, which is initially blank, but which the BFR updates to include information identifying which bit positions are reachable via the neighbor.

At 810, the BFR selects the first entry in the non-optimized BIFT. At 812, the BFR determines whether the selected bit position includes a set bit in the FBM of the non-optimized BIFT. If not, the BFR determines, at 818, whether the non-optimized BIFT includes more entries. If so, the BFR selects the next entry in the non-optimized BIFT and determines if the selected bit position is set. This continues until either the non-optimized BIFT has been completely traversed or the BFR locates an entry that has the selected BP set.

In response to detecting an entry with the corresponding BP set, the BFR copies, at 814, information identifying the neighbor from the corresponding entry in the non-optimized BIFT to the entry in the optimized BIFT. The BFR also copies, at 816, the FBM from the entry in the non-optimized BIFT to the entry in the optimized BIFT. At 822, the BFR determines whether additional BPs remain in the bit string. If so, the BFR selects the next BP, at 824. The method continues until all BPs in the bit string have been processed.

Using the example of FIG. 5B, the BFR selects the first bit in the FBM (BP=1) and determines if the first bit is set in the first entry of BIFT 504, e.g., the entry corresponding to NBR A. Since BP=1 is not set in the entry corresponding to NBR A, the BFR selects the second entry, and then the third entry, which also do not include a set bit at BP=1. In response to determining that the fourth entry, corresponding to NBR D, has the first bit set, the BFR updates the entry in the optimized BIFT (e.g., BIFT 506 of FIG. 5C) to include the FBM and NBR information from the fourth entry of BIFT 504. BFR then selects the next bit in the bit string (BP=2) and repeats the process iteratively until all bits in the bit string have been processed.

Figure 8B:
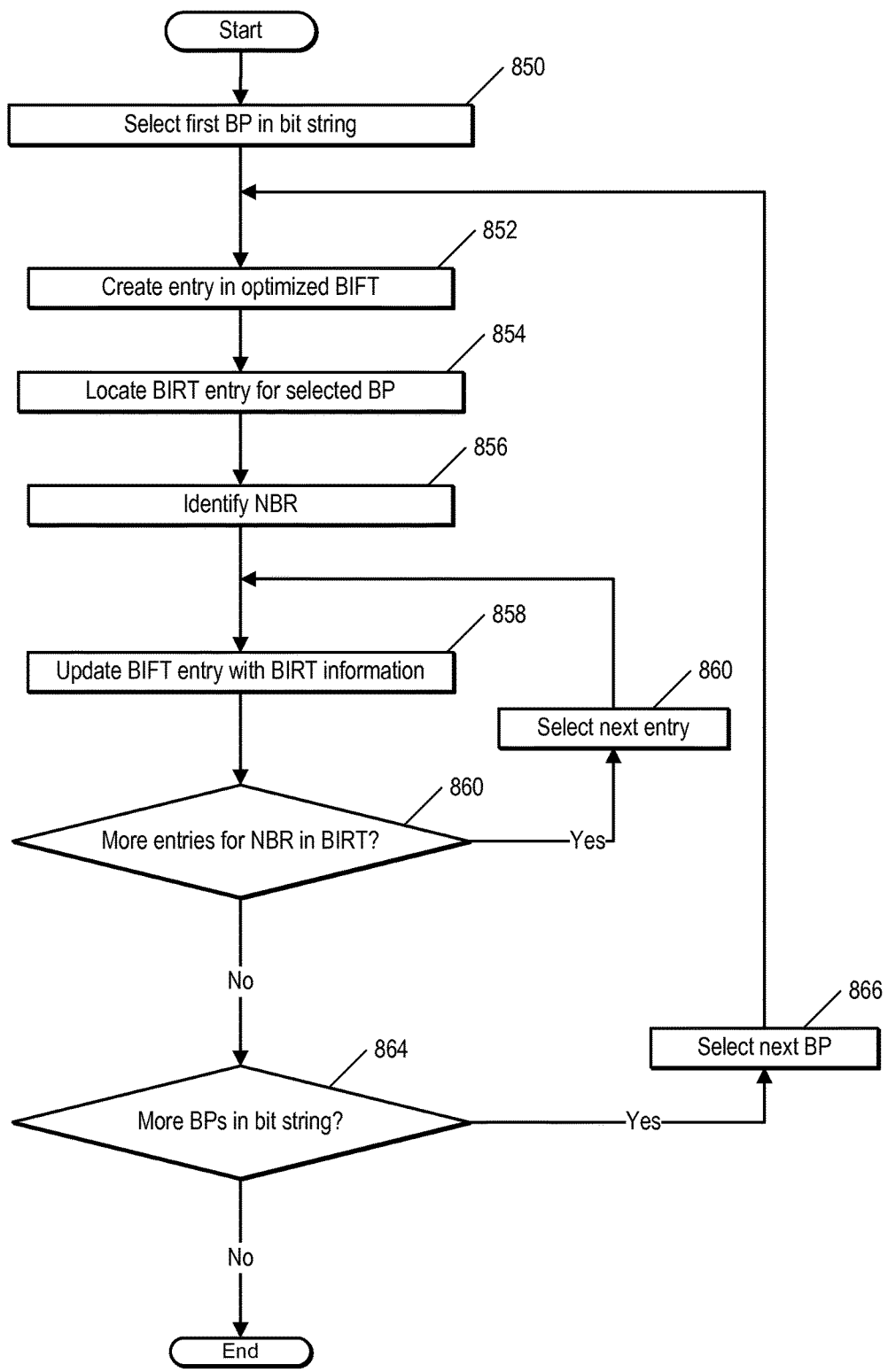
FIG. 8B is a flow chart illustrating an example process employed by a node, according to the present description.

FIG. 8B is a flow chart illustrating an example process of generating a BIFT employed by a node, according to the present description. In one embodiment, FIG. 8B is performed by a BFR, such as BFR 406 of FIG. 4. FIG. 8B depicts a method of generating an optimized BIFT, as shown, for example, in FIG. 5C, using information from the BFR's BIRT, as shown, for example, in FIG. 5A. In this embodiment, the optimized BIFT can be generated even if no existing BIFT is present.

At 850, the BFR selects the first BP in a bit string. At 852, the BFR creates an entry corresponding to the selected BP in the optimized BIFT. In one embodiment, the entry includes a field for information identifying a neighbor via which a BFER corresponding to the BP is reachable and an FBM, which is initially blank, but which the BFR updates to include information identifying which bit positions are reachable via the neighbor.

The BFR locates, at 854, an entry corresponding to the selected BP in the BIRT. At 856, the BFR determines the neighbor associated with the BP in the entry. The BFR updates, at 858, the neighbor field in the optimized BIFT entry corresponding to the BP. This indicates that the BP (e.g., the BFER assigned the BP) is reachable via the neighbor. The BFR also sets the bit corresponding to the BIRT entry, if the bit is not already set.

At 860, the BFR determines whether the BIRT includes additional entries that are associated with the neighbor. If so, the BFR selects the next entry and updates the optimized BIFT entry. In one embodiment, updating the BIFT entry involves setting the bit associated with the BIRT entry.

The BFR determines, at 864, whether additional bit positions remain in the bit string. If so, the BFR selects the next bit position in the bit string at 866. The method continues until all bit positions in the bit string are processed.

Using the example of BIRT 502, the BFR first selects BP=1 and locates an entry in BIRT 502 corresponding to BP=1. BIRT 502 indicates that BP=1 is reachable via node D. The BFR updates the entry corresponding to BP=1 with information identifying node D and setting the bit in BP=1. The BFR then determines if BIRT 502 includes any other entries corresponding to node D. The entry corresponding to BP=5 in BIRT 502 indicates that node D is the next hop via which the BFER corresponding to BP=5 is reachable. In response to determining that there is another entry corresponding to node D, the BFR updates the FBM corresponding to BP=1 in the optimized BIFT by setting the bit corresponding to BP=5.

Figure 9:
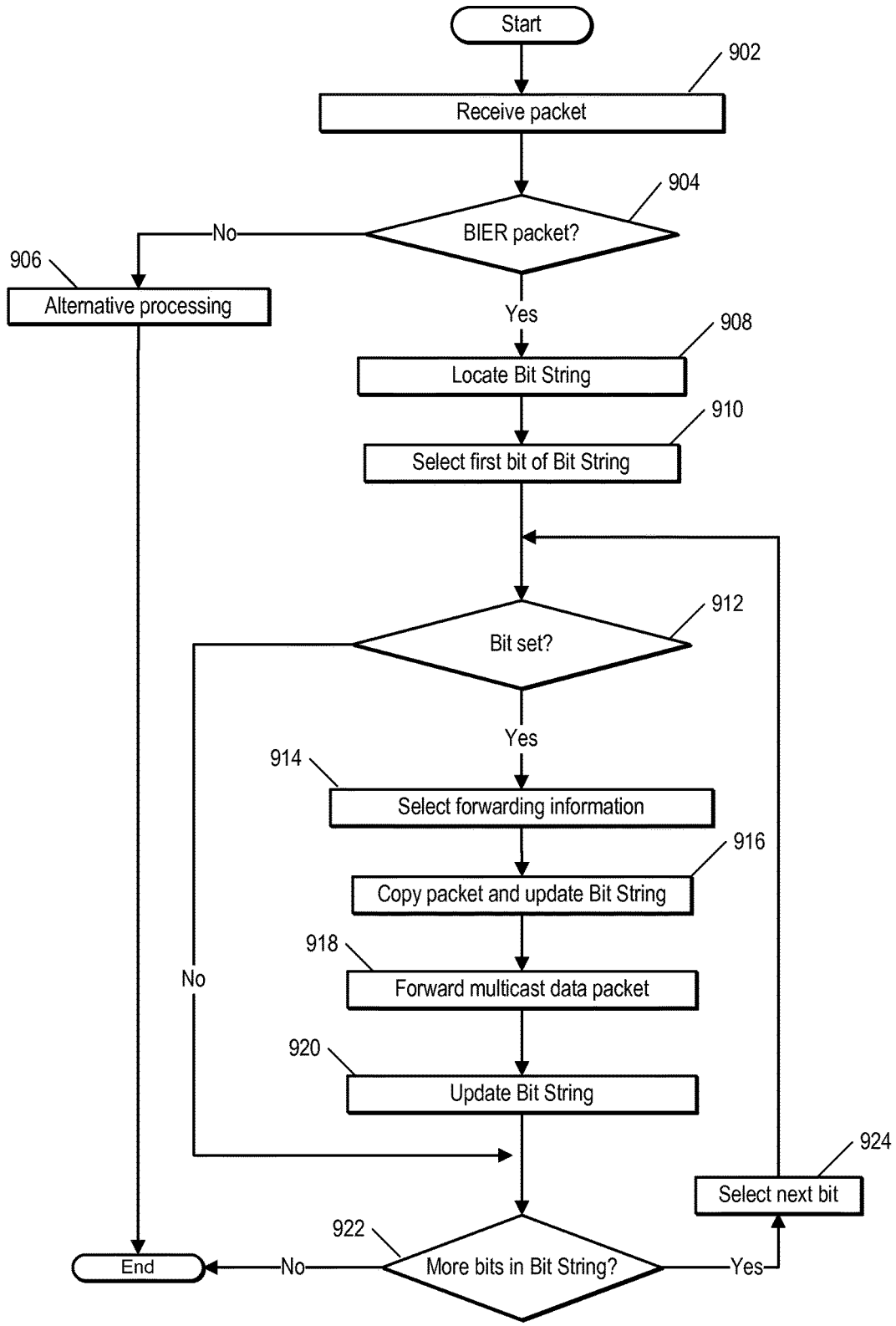
FIG. 9 is a flow chart illustrating an example process employed by a node, according to the present description.

FIG. 9 is a flow chart illustrating an example process of forwarding a multicast data packet employed by a node, according to the present description. In one embodiment, the process is performed by a BFR, such as BFR 406 of FIG. 4. The process of FIG. 9 can be performed using an optimized BIFT, such as optimized BIFT 506 of FIG. 5C.

At 902, the BFR receives a multicast data packet. The BFR determines, at 904, whether the multicast data packet is a BIER packet, and therefore includes a bit string. In one embodiment, the BFR scans the header of the multicast data packet for a value that indicates that the multicast data packet is a BIER packet. The BFR can detect that the sender of the multicast data packet was a BFR and therefore conclude that the multicast data packet is a BIER multicast data packet. If the multicast data packet is not a BIER multicast data packet, the BFR performs alternate processing at 906. In one embodiment, alternate processing 906 involves flooding the multicast data packet to all interfaces on the BFR, or dropping the multicast data packet. Alternatively, if traditional multicast forwarding information is available, the BFR can use that information to forward the packet.

If the multicast data packet is a BIER multicast data packet, the BFR knows that the multicast data packet includes a bit string. The BFR locates the bit string in the multicast data packet at 908. Using the bit string, the BFR determines which neighbors the multicast data packet should be forwarded to. In one embodiment, this involves selecting, as shown at 910, the first bit of the bit string and determining, as shown at 912, whether the first bit of the bit string is set. If the bit is not set, the BFR determines, at 922, whether more bits are present in the bit string. If so, the BFR selects the next bit at 924 and the method returns to 912.

In response to determining, at 912, that a bit in the bit string is set, the BFR selects, at 914, a forwarding entry with which to forward the multicast data packet. In one embodiment, the BFR selects a forwarding entry that corresponds to the bit position of the set bit in the bit string. At 916, the BFR creates a copy of the multicast data packet and updates the bit string in the copy of the multicast data packet. Updating the bit string in the copy of the multicast data packet involves clearing bits in the bit string that correspond to neighbors that are not reachable via a shortest path from the interface to which the copy of the packet is being forwarded. This can be accomplished by performing an AND operation between the bit string from the incoming multicast data packet and the bit mask in the forwarding table entry that corresponds to the selected bit. The resulting value is used as the bit string for the copy of the multicast data packet. At 918, the BFR forwards the multicast packet to the interface.

At 920, the BFR updates the bit string that arrived in the multicast data packet by clearing those bits in the multicast data packet's bit string that correspond to the bits which were set in the multicast data packet that the BFR forwarded. In one embodiment, this involves performing an AND operation between the bit string in the received multicast data packet, and the inverse of the bit mask in the entry corresponding to the selected bit. This has the effect of clearing those bits that correspond to bit positions which were set in the bit string of the outgoing packet, which prevents looping and duplication. The BFR then determines, at 922, whether more bits are present in the bit string. If so, the BFR selects the next bit at 924. The BFR continues to walk to the bit string of the received multicast data packet, bit-by-bit, until the end of the bit string is reached.

Figure 10:
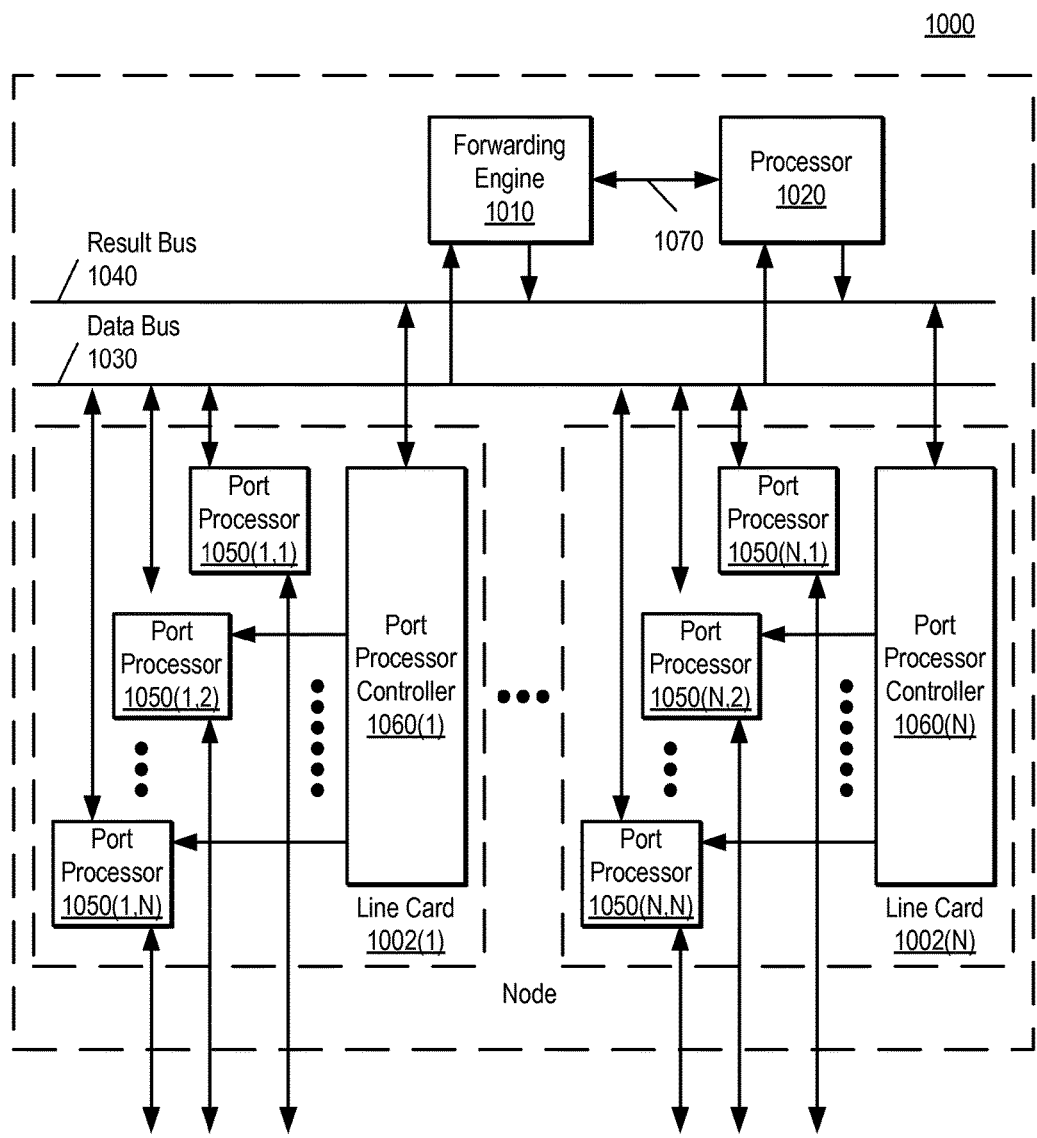
FIG. 10 is a block diagram illustrating certain components of an example node that can be employed, according to the present description.

FIG. 10 is a block diagram illustrating certain additional and/or alternative components of nodes that can be employed, for example in the network shown in FIG. 3. In this depiction, node 1000 includes a number of line cards (line cards 1002(1)-(N)) that are communicatively coupled to a forwarding engine or packet forwarder 1010 and a processor 1020 via a data bus 1030 and a result bus 1040. Line cards 1002(1)-(N) include a number of port processors 1050(1,1)-(N,N) which are controlled by port processor controllers 1060(1)-(N). It will also be noted that forwarding engine 1010 and processor 1020 are not only coupled to one another via data bus 1030 and result bus 1040, but are also communicatively coupled to one another by a communications link 1070.

The processors 1050 and 1060 of each line card 1002 may be mounted on a single printed circuit board. When a packet or packet and header are received, the packet or packet and header may be identified and analyzed by router 1000 in the following manner. Upon receipt, a packet (or some or all of its control information) or packet and header is sent from the one of port processors 1050(1,1)-(N,N) at which the packet or packet and header was received to one or more of those devices coupled to data bus 1030 (e.g., others of port processors 1050(1,1)-(N,N), forwarding engine 1010 and/or processor 1020). Handling of the packet or packet and header can be determined, for example, by forwarding engine 1010. For example, forwarding engine 1010 may determine that the packet or packet and header should be forwarded to one or more of port processors 1050(1,1)-(N, N). This can be accomplished by indicating to corresponding one(s) of port processor controllers 1060(1)-(N) that the copy of the packet or packet and header held in the given one(s) of port processors 1050(1,1)-(N,N) should be forwarded to the appropriate one of port processors 1050(1,1)-(N,N). In addition, or alternatively, once a packet or packet and header has been identified for processing, forwarding engine 1010, processor 1020 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 11:
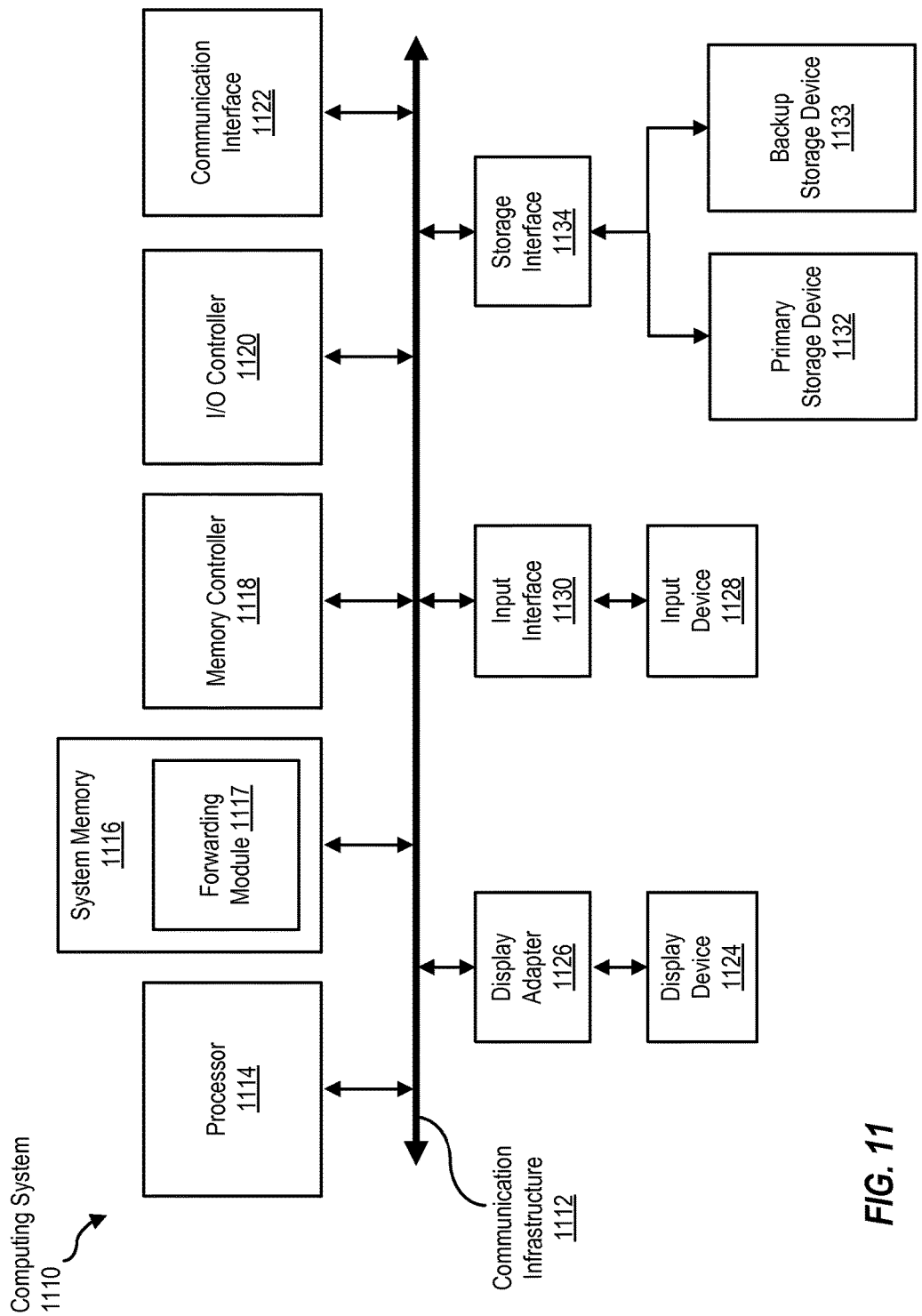
FIG. 11 is a block diagram depicting a computer system suitable for implementing embodiments of the systems described herein.

FIG. 11 is a block diagram of a computing device, illustrating how a forwarding module can be implemented in software, as described above. Computing system 1110 broadly represents any single or multi-processor computing device or system capable of executing computer-readable instructions. Examples of computing system 1110 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1110 may include at least one processor 1114 and a system memory 1116. By executing the software that implements a forwarding module 1117, computing system 1110 becomes a special purpose computing device that is configured to perform packet forwarding, in the manner described above.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the embodiments described and/or illustrated herein. For example, processor 1114 may perform and/or be a means for performing the operations described herein. Processor 1114 may also perform and/or be a means for performing any other operations, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, program instructions executable to implement a forwarding module configured to forward multicast data packets may be loaded into system memory 1116.

In certain embodiments, computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the operations or features described and/or illustrated herein.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

Communication interface 1122 broadly represents any type or form of communication device or adapter capable of facilitating communication between computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer) for display on display device 1124.

As illustrated in FIG. 11, computing system 1110 may also include at least one input device 1128 coupled to communication infrastructure 1112 via an input interface 1130. Input device 1128 generally represents any type or form of input device capable of providing input, either computer or human generated, to computing system 1110. Examples of input device 1128 include, without limitation, a keyboard, a pointing device, a speech recognition device, or any other input device.

As illustrated in FIG. 11, computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110. A storage device like primary storage device 1132 can store information such as routing tables and forwarding tables.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11.

Computing system 1110 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1110 for storage in memory via a network such as the Internet or upon a carrier medium.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1110 may be configured as an application specific integrated circuit (ASIC) adapted to implement one or more of the embodiments disclosed herein.

Figure 12:
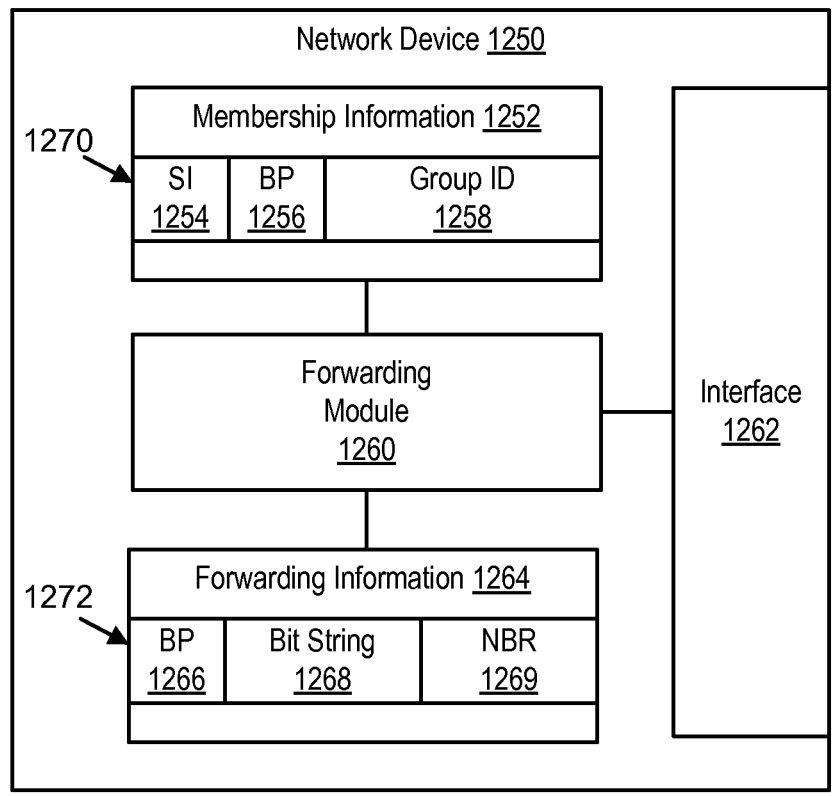
FIG. 12 is a block diagram depicting a network device suitable for implementing embodiments of the systems described herein.

FIG. 12 is a block diagram of an exemplary network device that may be associated with a node in network 200 of FIG. 2. Network device 1250 of FIG. 12 may, for example, be associated with BIER-enabled node 206 in FIG. 2. In some cases "node" as used herein encompasses one or more network devices associated with the node. "Network devices" as used herein includes various devices, such as routers, switches, or network controllers that perform routing and/or forwarding functions and support one or more routing and/or switching protocols. A network device maintains one or more routing and/or forwarding tables that store routing and/or forwarding information identifying paths to various data sources and/or data consumers. In, for example, a multicast-enabled node, a network device implements a multicast routing protocol that is used to convey multicast data packets from a multicast source to a multicast receiver.

In the embodiment of FIG. 12, network device 1250 includes storage for membership information 1252, storage for forwarding information 1264, a forwarding module 1260, and an interface 1262. Interface 1262 is coupled to send and receive packets and/or other network messages. It is noted that network device 1250 may include additional interfaces, and that each interface can be a logical or physical interface. In one embodiment, interface 1262 includes one or more ports.

Forwarding module 1260 is configured to perform forwarding based on the stored forwarding information 1264. Forwarding module 1260 is also configured to update the stored membership information 1252 and forwarding information 1264. Forwarding module 1260 can implement one or more instances of a layer 3 protocol and/or a layer 2 protocol.

Entry 1270 provides an example of membership information stored in memory of a network device. As shown, entry 1270 includes a set identifier 1254, information 1256 identifying a bit position (BP), and information 1258 identifying a multicast group. The SI and BP identify a node with which entry 1270 is associated, and the multicast group information identifies a multicast group to which the corresponding node is subscribed. The storage for membership information 1252 is, in one embodiment, implemented as a group membership table.

Entry 1272 provides an example of forwarding information that can be stored in memory of a network device. As shown, entry 1272 includes information 1266 identifying a BP, a bit string or bit array 1268, and information 1269 identifying a neighbor. Forwarding module 1260 uses the information in entry 1272 to forward multicast data packets to the interface associated with the neighbor identified in the entry. The storage for forwarding information 1264 is, in one embodiment, implemented as a bit indexed forwarding table (BIFT).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 receiving a packet at a node, wherein
  the packet comprises a bit string;
 selecting a selected entry in a bit indexed forwarding table (BIFT) generated, using at least one of a bit-indexed routing table (BIRT) or an existing BIFT generated using the BIRT, such that the BIFT is indexed by bit position, wherein
  the BIFT comprises a plurality of entries, each of which
   corresponds to a corresponding bit position in the bit string, and
   stores a corresponding identifier of a plurality of identifiers,
  as a result of the BIFT being indexed by bit position, the BIFT allows a plurality of the corresponding identifiers to correspond to another node,
  the selecting comprises
   identifying a bit position, and
   in response to a first value of a first bit stored in the bit string at the bit position and a second value of a second bit stored in the entry indicating that the entry should be selected as the selected entry, selecting an entry in the BIFT corresponding to the bit position, as the selected entry, and
  the selected entry comprises
   a forwarding bit mask, and
   an identifier; and
 in response to the entry being selected as the selected entry, forwarding the packet to the another node, wherein
  the another node is identified by the identifier, and
  the forwarding comprises
   creating an outgoing bit string in an outgoing packet using at least the forwarding bit mask and the bit string, and
   transmitting the outgoing packet to the another node.

2. The method of claim 1, further comprising:
 generating the BIFT such that the BIFT is indexed by bit position, wherein
  the generating comprises at least one of
   converting the existing BIFT to the BIFT by converting an entry in the existing BIFT to an entry in the BIFT, for each bit forwarding egress router of a plurality of bit forwarding egress routers, or
   accessing an entry in the BIRT to generate the entry in the BIFT, for the each bit forwarding egress router of the plurality of bit forwarding egress routers.

3. The method of claim 1, wherein the forwarding further comprises:
 performing an update operation comprising
  updating the first value of the first bit such that the first bit indicates the forwarding of the packet to the another node.

4. The method of claim 3, wherein the update operation further comprises:
 updating a value of another bit at another bit position in the bit string such that the another bit indicates the forwarding of the packet to the another node, wherein the another bit position is other than the bit position.

5. The method of claim 1, wherein the identifying the bit position comprises:
 locating a set bit in the bit string.

6. The method of claim 1, wherein the selecting the entry further comprises:
 determining whether the entry in the BIFT corresponding to the bit position should be selected, wherein
  the determining is based, at least in part, on the first value and the second value.

7. The method of claim 1, wherein the creating the outgoing bit string comprises:
 performing a bit-wise logical AND operation between the forwarding bit mask and the bit string.

8. The method of claim 1, wherein
 the plurality of the corresponding identifiers correspond to the another node.

9. A network device comprising:
 one or more processors;
 a memory, wherein the memory is
  configured to store a bit indexed forwarding table (BIFT) generated, using at least one of a bit-indexed routing table (BIRT) or an existing BIFT generated using the BIRT, such that the BIFT is indexed by bit position, and
  coupled to the one or more processors;
 a network interface, configured to receive a packet and coupled to the one or more processors, wherein
  the packet comprises a bit string; and
 a non-transitory computer-readable storage medium, coupled to the one or more processors and storing program instructions that, when executed, are configured to cause the one or more processors to
  select a selected entry in the BIFT, wherein
   the BIFT comprises a plurality of entries, each of which
    corresponds to a corresponding bit position in the bit string, and
    stores a corresponding identifier of a plurality of identifiers,
   as a result of the BIFT being indexed by bit position, the BIFT allows a plurality of the corresponding identifiers to correspond to another node,
   the program instructions configured to select the selected entry comprise further program instructions configured to identify a bit position, and
    in response to a first value of a first bit stored in the bit string at the bit position and a second value of a second bit stored in the entry indicating that the entry should be selected as the selected entry, select an entry in the BIFT corresponding to the bit position, as the selected entry, and
   the selected entry comprises
    a forwarding bit mask, and
    an identifier, and
  in response to the entry being selected as the selected entry, forward the packet to the another node, wherein
   the another node is identified by the identifier, and
   the program instructions configured to cause the one or more processors to forward comprise further program instructions configured to cause the one or more processors to create an outgoing bit string in an outgoing packet using at least the forwarding bit mask and the bit string, and transmit the outgoing packet to the another node.

10. The network device of claim 9, wherein the program instructions are further configured to cause the one or more processors to:

generate the BIFT, such that the BIFT is indexed by bit position, by virtue of comprising at least one of program instructions configured to cause the one or more processors to convert the existing BIFT to the BIFT by converting an entry in the existing BIFT to an entry in the BIFT, for each bit forwarding egress router of a plurality of bit forwarding egress routers, or access an entry in the BIRT to generate the entry in the BIFT, for the each bit forwarding egress router of the plurality of bit forwarding egress routers.

11. The network device of claim 9, wherein the program instructions configured to cause the one or more processors to forward further comprise program instructions configured to cause the one or more processors to:

perform an update operation comprising updating the first value of the first bit such that the first bit indicates the forwarding of the packet to the another node.

12. The network device of claim 11, wherein the update operation further comprises:

updating a value of another bit at another bit position in the bit string such that the another bit indicates the forwarding of the packet to the another node, wherein the another bit position is other than the bit position.

13. The network device of claim 9, wherein the program instructions configured to cause the one or more processors to select the entry further comprise program instructions configured to cause the one or more processors to:

determine whether the entry in the BIFT corresponding to the bit position should be selected, based, at least in part, on the first value and the second value.

14. The network device of claim 9, wherein the program instructions configured to cause the one or more processors to create the outgoing bit string comprise program instructions configured to cause the one or more processors to:

perform a bit-wise logical AND operation between the forwarding bit mask and the bit string.

15. The network device of claim 9, wherein the plurality of the corresponding identifiers correspond to the another node.

16. A system comprising:

processing means for processing program instructions;

storage means for storing, coupled to the processing means, wherein the storage means is configured to store a bit indexed forwarding table (BIFT) generated, using at least one of a bit-indexed routing table (BIRT) or an existing BIFT generated using the BIRT, such that the BIFT is indexed by bit position;

network interface means for receiving a packet, wherein the network interface means is coupled to the processing means, and the packet comprises a bit string; and non-transitory computer-readable storage means for storing the program instructions, coupled to the processing means and storing the program instructions, which are configured to cause the processing means to select a selected entry in the BIFT, wherein the BIFT comprises a plurality of entries, each of which corresponds to a corresponding bit position in the bit string, and stores a corresponding identifier of a plurality of identifiers, as a result of the BIFT being indexed by bit position, the BIFT allows a plurality of the corresponding identifiers to correspond to another node, the program instructions configured to select the selected entry comprise further program instructions configured to identify a bit position, and in response to a first value of a first bit stored in the bit string at the bit position and a second value of a second bit stored in the entry indicating that the entry should be selected as the selected entry, select an entry in the BIFT corresponding to the bit position, as the selected entry, and the selected entry comprises a forwarding bit mask, and an identifier, and in response to the entry being selected as the selected entry, forward the packet to the another node, wherein the another node is identified by the identifier, and the program instructions configured to cause the processing means to forward comprise further program instructions configured to cause the processing means to create an outgoing bit string in an outgoing packet using at least the forwarding bit mask and the bit string, and transmit the outgoing packet to the another node.

17. The system of claim 16, wherein program instructions are further configured to cause the processing means to:

generate the BIFT, such that the BIFT is indexed by bit position, by virtue of comprising at least one of program instructions configured to cause the processing means to convert the existing BIFT to the BIFT by converting an entry in the existing BIFT to an entry in the BIFT, for each bit forwarding egress router of a plurality of bit forwarding egress routers, or access an entry in the BIRT to generate the entry in the BIFT, for the each bit forwarding egress router of the plurality of bit forwarding egress routers.

18. The system of claim 16, wherein the program instructions configured to cause the processing means to forward further comprise program instructions configured to cause the processing means to:

perform an update operation comprising updating the first value of the first bit such that the first bit indicates the forwarding of the packet to the another node.

19. The system of claim 18, wherein the update operation further comprises:

updating a value of another bit at another bit position in the bit string such that the another bit indicates the forwarding of the packet to the another node, wherein the another bit position is other than the bit position.

20. The system of claim 16, wherein the program instructions configured to cause the processing means to select the entry further comprise program instructions configured to cause the processing means to:

determine whether the entry in the BIFT corresponding to the bit position should be selected, based, at least in part, on the first value and the second value.

* * * * *

UNITED STATES PATENT AND TRADEMARK OFFICE
CERTIFICATE OF CORRECTION

PATENT NO. : 9,806,897 B2
APPLICATION NO. : 14/603580
DATED : October 31, 2017
INVENTOR(S) : Ijsbrand Wijnands, Gregory J. Shepherd and John H. W. Bettink Page 1 of 1

It is certified that error appears in the above-identified patent and that said Letters Patent is hereby corrected as shown below:

On the Title Page

Related U.S. Application Data (63) should read as follows:
Related U.S. Application Data
(63) Continuation-in-part of U.S. Application No. 14/488,790, filed September 17, 2014, which claims the benefit of U.S. Provisional Patent Application Nos. 61/878,693, filed September 17, 2013, and 61/931,473, filed January 24, 2014.
Continuation-in-part of U.S. Application No. 14/488,761, filed September 17, 2014, which claims the benefit of U.S. Provisional Patent Application Nos. 61/878,693, filed September 17, 2013, and 61/931,473, filed January 24, 2014.
Continuation-in-part of U.S. Application No. 14/488,810, filed September 17, 2014, which claims the benefit of U.S. Provisional Patent Application Nos. 61/878,693, filed September 17, 2013, and 61/931,473, filed January 24, 2014.

Related U.S. Application Data (60) should read as follows:
Related U.S. Application Data
(60) Provisional application No. 61/931,473, filed on Jan. 24, 2014.

Signed and Sealed this
Eighth Day of October, 2019

Andrei Iancu
*Director of the United States Patent and Trademark Office*